United States Patent
Haisma et al.

(10) Patent No.: US 6,697,120 B1
(45) Date of Patent: Feb. 24, 2004

(54) POST-SYNCHRONIZING AN INFORMATION STREAM INCLUDING THE REPLACEMENT OF LIP OBJECTS

(75) Inventors: Nicoline Haisma, Eindhoven (NL); Johannes Govert Sinke, Eindhoven (NL); Bas Arnold Jan Bergevoet, Eindhoven (NL); Henricus Antonius Wilhelmus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 667 days.

(21) Appl. No.: 09/599,782

(22) Filed: Jun. 22, 2000

(30) Foreign Application Priority Data

Jun. 24, 1999 (EP) ............................................. 99202034

(51) Int. Cl.[7] .............................................. H04N 9/475
(52) U.S. Cl. ...................... 348/515; 348/578; 348/553; 345/473
(58) Field of Search ................................ 348/515, 553, 348/578; 704/235, 270, 278, 276, 275; 434/185; 345/473; 725/32

(56) References Cited

U.S. PATENT DOCUMENTS

| | | | | |
|---|---|---|---|---|
| 4,827,532 A | * | 5/1989 | Bloomstein | 382/41 |
| 5,880,788 A | * | 3/1999 | Bregler | 348/515 |
| 6,492,990 B1 | * | 12/2002 | Peleg et al. | 345/473 |

FOREIGN PATENT DOCUMENTS

| | | | | |
|---|---|---|---|---|
| EP | 0 674 315 A1 | * | 9/1995 | G11B/27/032 |
| JP | 06052290 A | * | 2/1994 | G06F/15/62 |

OTHER PUBLICATIONS

Bregler C. et al, "Video Rewrite: Driving Visual Speech With Audio", Computer Graphics Proceedings Siggraph, US, Reading Addison Wesley, Aug. 3, 1997, pp. 353–360, XP000765835, ISBN: 0–201–3220–7.

* cited by examiner

Primary Examiner—Victor R. Kostak (57) ABSTRACT

The invention provides a method for post-synchronizing an information stream. Original lip-objects (lo) are obtained (2) from a video signal (V). These original lip-objects (lo) are replaced (3,4) with new lip-objects (lo*), which correspond to a translated audio signal (A*). Lip-objects (lo) can be obtained from the video signal (V) by using an object-oriented coding technique, e.g. MPEG-4. The coding standard MPEG-4 offers the facilities to manipulate the lip-objects (lo). Several configurations are presented. The new lip-objects (lo*) can be obtained by tracking a further video signal or by using a database with visemes or lip-parameters. The invention is suitable for a communication network, e.g. for video-conferencing. A multi-language information stream comprises a plurality of audio signals (A,A*) and a plurality of lip-objects (lo,lo*) that are each linked to one of the audio signals (A,A*). This gives the possibility to select at the receiver a desired language. An advantage of the invention is that lip-movements better correspond to the translated audio.

5 Claims, 4 Drawing Sheets

POST-SYNCHRONIZING AN INFORMATION STREAM INCLUDING THE REPLACEMENT OF LIP OBJECTS

The invention relates to a method of post-synchronizing an information stream, which information stream comprises an audio signal and a video signal, the method comprising the step of: performing a translation process to obtain at least one translated audio signal.

The invention further relates to a transmitter for transmitting an information stream comprising at least one translated audio signal and a video signal.

The invention further relates to a receiver for receiving an information stream.

The invention further relates to a communication system comprising: a plurality of stations comprising means for transmitting and means for receiving an information stream, which information stream comprises an audio and a video signal; and a communication network for linking said stations.

The invention further relates to an information stream comprising a video signal and a plurality of audio signals relating to different languages and a storage medium.

Post-synchronizing an information stream is especially known from the field of movies and television programs. Post-synchronization means that the original audio signal is replaced by another audio signal that is normally a translation of the original audio signal. This has the advantage that an audience that does not understand the original language can understand the movie without having to read subtitles. It is however annoying to the audience that the movement of the lips does not correspond anymore to the audio signal.

It is, inter alia, an object of the invention to overcome the above-mentioned problem. To this end, a first aspect of the invention provides a method characterized in that the method comprises the steps of: tracking said video signal to obtain original lip-objects; replacing said original lip-objects with new lip-objects, said new lip-objects corresponding to said translated audio signal.

The facilities to track and manipulate lip-objects are provided by an object-oriented coding technique, e.g. MPEG-4. Because of the object-oriented nature of such a coding technique, the lip-objects are regarded as separate objects that can be handled and manipulated separately. An overview of the MPEG-4 standard is given in the ISO/IEC document JTC1/SC29/WG11/N2459, October 1998, Atlantic City, further referred to as the "MPEG-4 standard". Further information can be found in the ISO/IEC document JTC1/SC29/WG11/N2195, March 1998, Tokyo, which describes MPEG-4 Applications. MPEG-4 is an ISO/IEC standard developed by MPEG (Motion Picture Experts Group). This standard provides the standardized technological elements enabling the integration of the production, distribution and content access paradigms of three fields: digital television, interactive graphics applications (synthetic content) and interactive multimedia. MPEG-4 provides ways to represent units of aural, visual or audio-visual content, called "media objects". These media objects can be of natural or synthetic origin; this means that they could be recorded with a camera or microphone, or generated with a computer. Audiovisual scenes are composed of several media objects, e.g. audio and video objects. MPEG-4 defines the coded representation of objects such as synthetic face objects and synthetic sound. MPEG-4 provides facilities to distinguish different objects of a scene. In particular, it is possible by lip-tracking to record lips of a person as a separate object, a so-called lip-object. This lip-object can be manipulated. From the lip-object it is possible to extract lip-parameters that describe the lips on base of a lip-model. Such a lip-model can be locally stored, which makes it possible to construct lips by only sending the according lip-parameters.

According to the invention, the original lip-objects are replaced with new lip-objects that correspond to the translated audio signal. In this way, a video signal is obtained wherein lip-movements better correspond to the translated signal. The translation becomes more natural and in an ideal case the viewer will not notice that the information stream is in fact a translation of an original information stream. Lip-objects comprise lips as well as relevant parts of the face.

According to the MPEG-4 standard, media objects can be placed anywhere in a given coordinate system. Transforms can be applied to change the geometrical or acoustical appearance of a media object. Streamed data can be applied to media objects in order to modify their attributes. Synchronization of elementary streams is achieved through time stamping of individual access units within elementary streams. Usually, the new lip-objects are synchronized with the translated audio signal.

The tools for representing natural video in the MPEG-4 visual standard aim at providing standardized core technologies allowing efficient storage, transmission and manipulation of textures, images and video data for multimedia environments. These tools allow the decoding and representation of atomic units of image and video content, called video objects. An example of a video object could be a talking person or only his lips.

The face is an object capable of facial geometry ready for rendering and animation. The shape, texture and expressions of the face are generally controlled by a bit stream containing instances of Facial Definition Parameter (FDP) sets and/or Facial Animation Parameter (FAP) sets. Frame-based and temporal-DCT coding of a large collection of FAPs can be used for accurate speech articulation.

Viseme and expression parameters are used to code specific speech configurations of the lips and the mood of the speaker. A viseme is a sequence of one or more facial feature positions corresponding to a phoneme. A phoneme is a distinct speech element that represents shortest representative phonetics. Visemes perform the basic units of visual articulatory mouth shapes. A viseme comprises mouth parameters which specify the mouth opening, height, width and protrusion. The face animation part of the standard allows sending parameters that calibrate and animate synthetic faces. These models themselves are not standardized by MPEG-4, only the parameters are. The new lip-objects can always be manipulated to fit best in the video signal.

Advantageous embodiments of the invention are defined in the dependent claims. An embodiment of the invention provides a method, characterized by comprising the step of: obtaining said new lip-objects by tracking at least one further video signal, said further video signal comprising lip-movements corresponding to said translated audio signal. This embodiment describes a method to obtain the new lip-objects. Because the further video signal comprises lip-movements that correspond to the translated audio signal, the lip-objects that are derived from the further video signal correspond to the translated audio signal. Preferably, the further video signal is obtained by recording the lips of a translator or an original actor. Tracking lip-objects is performed on this further video signal to obtain the new lip-objects. It may be efficient to combine the recording of the lip-movement and the translation of the audio signal. A translator or an original actor can for example provide the translated audio signal as well as the lip-objects at the same time. The advantage of an original actor is that the correspondence of the lips is better, because the new lip-objects originate from the same lips as the original lip-objects.

A further embodiment of the invention provides a method wherein said translation process comprises the steps of: converting the original audio signal into translated text; and deriving said translated audio signal and said new lip-objects from said translated text. In this embodiment, the result of a translation process is translated text. The translated text can be obtained with keyboard input from a translator or by analyzing the audio signal. A computer may for example first convert the audio signal into text and thereafter translate the text into translated text. The translated text is in this case used to derive the translated audio signal, e.g. by use of a Text-To-Speech coder. The translated text signal is also used to derive the new lip-objects. One letter or a combination of letters in the translated text defines a phoneme as well as a viseme. The phoneme and viseme definitions are for example stored in a database. Such a TTS coder is known from the MPEG-4 standard. A TTS coder allows a text or a text with prosodic parameters (pitch contour, phoneme duration, etc) as its inputs to generate intelligible synthetic speech. It supports the generation of parameters, which can be used to allow synchronization to associated face animation, international languages for text and international symbols for phonemes. Additional markups are used to convey control information within texts, which is forwarded to other components in synchronization with the synthesized text. MPEG-4 provides a standardized interface for the operation of a TTS coder rather than a normative TTS coder itself. In general, coders are available for generating sound based on structured inputs.

A further embodiment of the invention provides a method characterized by comprising the steps of: dividing said translated audio signal into phonemes; retrieving, from a database, visemes that correspond to said phonemes; and constructing said new lip-objects from said visemes. Preferably, said translation process comprises the steps of: converting said phonemes into text; translating said text into translated text; and deriving said translated audio signal from said translated text. Analyzing an audio signal to obtain phonemes and visemes is known from the art. U.S. Pat. No. 5,608,839 discloses a sound-synchronized video system in which a stream of unsynchronized audio signal, representing speech, and video signal of a speaker, is processed by decoding the signal. A plurality of visemes is memorized corresponding to phonemes in the audio signal. Visemes are fetched corresponding to phonemes in the audio signal, and a synchronism is imparted to the video signal and audio signal by applying the fetched visemes to the unsynchronized video signal of the stream in synchronism with corresponding phonemes in the audio signal of the stream. According to an embodiment, the fetching step includes fetching visemes of the lip movement. The system is suitable for use in a videophone. In this way, the delay that occurs in both directions in a video conferencing system is shortened.

Modeling of lip-objects is a known technique, which is especially advantageous in the field of compression. A lip-object can be defined using a lip-model and specific lip-parameters. This is very useful for compression because it suffices to transmit the lip-parameters to define a lip-object. Using lip-parameters is also useful in accordance with the invention because only a selection of the parameters have to be changed. When a lip-model is available at the receiver's end, it suffices to transmit the modified lip-parameters. If desired also the original lip-parameters may be transmitted. Preferably, the new lip-objects are constructed from the original lip-objects by modifying the lip-parameters. This leads to a best fit for the new lip-objects. In some cases, e.g. where the difference between the original and the new lip-objects is small, it may be profitable to send the new lip-parameters as difference signals to a receiver in addition to the original lip-parameters that is also used as a reference.

A transmitter according to the invention is characterized in that the transmitter comprises: tracking means for tracking said video signal to obtain original lip-objects; means for adding new lip-objects to the information stream to replace said original lip-objects, the new lip objects corresponding to said translated audio signal. If the original lip-objects in the video signal have been replaced by the new lip-objects before transmission, the information stream can be received and handled by an ordinary receiver. In a further embodiment the transmitter comprises: means for transmitting a plurality of audio signals relating to different languages and a plurality of lip-objects, which lip-objects are each linked to at least one of said plurality of audio signals. This information stream gives the receiver the possibility to select the desired language for audio as well as for video. It is known from the art to transmit multiple languages, however only in audio. By transmitting only lip-objects or even lip-parameters for multiple languages an efficient transmission and storage of multiple language movies and other audiovisual programs is obtained.

A first receiver according to the invention is characterized in that the receiver comprises: translation means for performing a translation process to obtain a translated audio signal; means for adding'said translated audio signal to the information stream; tracking means for tracking said video signal to obtain original lip-objects; means for adding new lip-objects to the information stream that correspond to said translated audio signal; and outputting means for outputting said translated audio signal and said video signal, in which video signal said original lip-objects have been replaced with said new lip-objects. This first receiver comprises translation means in the receiver. The received information stream comprises an audio and a video signal in an original language. This embodiment has the advantage that the translation in a desired (user-selected) language is performed locally, i.e. independent of any transmitter or broadcast-organization.

A second receiver according to the invention is characterized in that the receiver comprises tracking means for tracking said video signal to obtain original lip-objects; means for adding to the information stream, new lip-objects that correspond to said translated audio signal; and outputting means for outputting said translated audio signal and said video signal, in which video signal said original lip-objects have been replaced with said new lip-objects. A difference with the known receiver of U.S. Pat. No. 5,608, 839 is that the new lip-objects according to the invention correspond to a translated audio signal. The original audio signal is not unsynchronized with the video signal, but the lip-movements of the original lip-objects do not correspond to the translated audio signal, because the original lip-objects correspond to the original audio signal. A database in a receiver according to the invention should comprise phonemes and visemes of the desired languages.

A third receiver according to the invention receives an information stream which comprises: a video signal, a plurality of audio signals relating to different languages and a plurality of lip-objects, which lip-objects are each linked to at least one of said plurality of audio signals; which receiver comprises: a selector for obtaining a selected audio signal from said plurality of audio signals; outputting means for outputting said selected audio signal and said video signal, said video signal comprising selected lip-objects, which lip-objects are linked to said selected audio signal.

A communication network according to the invention comprises means for performing a translation process to obtain at least one translated audio signal; means for tracking said video signal to obtain original lip-objects; and means for replacing said original lip-objects with new lip-objects, said new lip-objects being synchronized with said translated audio signal. Such a communication network comprises for example receivers and transmitters as discussed above.

Cheung et al., "Text-driven Automatic Frame Generation using MPEG-4 Synthetic/Natural Hybrid Coding for 2-D Head-and Shoulder Scene", Proc. Int. Conf. on Image Processing, vol. 2, Santa Barbara, 1997, pp 69–72, describes a facial modeling technique based on MPEG-4 for automatic frame sequence generation of a talking head. With the definition and animation parameters on a generic face object, the shape, textures and expressions of an adapted frontal face can generally be controlled and synchronized by the phonemes transcribed from plain text. The segmenting type can be syllable, intonational phrase or phonetics. Since human speech of any language can be decomposed into their shortest representative phonetics set, lip/facial synchronization can be achieved. Plain text will be transcribed into orthographic phonetic symbols, a computer readable phonetic alphabet. By using a high quality phoneme-to-speech synthesizer for producing the speech, text-driven lip-synch application can be easily developed. The amounts of lips' opening and mouth shape of each frame represent the corresponding facial motion for the pronunciation of the phonemes.

None of the mentioned documents discloses or makes it obvious to replace original lip-objects with new lip-objects, which correspond to a translated signal. The documents however describe tools such as the use of lip-objects and techniques to synthesize audio from text. The manner of extracting phonemes from speech sequences, the manner of memorizing visemes corresponding to phonemes, the manner of extracting the correct facial features and applying them to a video signal are known from the art.

The aforementioned and other aspects of the invention will be apparent from and elucidated with reference to the embodiments described hereinafter.

The drawings only show those elements that are necessary to understand the invention.

Figure 1:
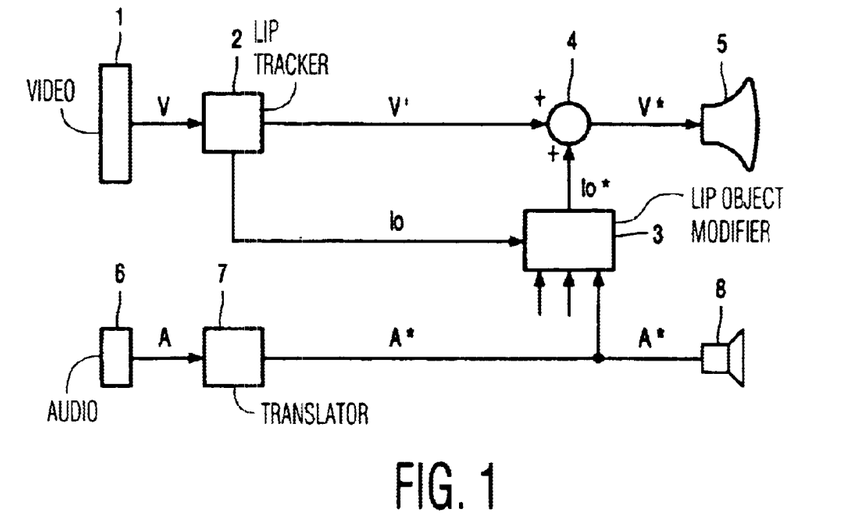
FIG. 1 shows a system for post-synchronization according to the invention.

The system for post-synchronization as shown in FIG. 1 comprises a video source 1 and an audio source 6 for obtaining an information stream that comprises a video signal V (obtained by the video source 1) and an audio signal A (obtained by the audio source 6). The video source 1 can be an image sensor, a computer, etc. The audio source 6 can be a microphone or a computer, etc. The audio signal A is translated into a translated audio signal A* in a translator 7. The translated audio signal A* is output to a speaker 8. The video signal V is tracked in a lip-tracker 2 to obtain original lip-objects lo. As an example, this tracking is performed in an MPEG-4 encoder. As described above, the MPEG-4 standard provides tools to track lip-objects and to define them in a video signal. The result of the lip tracking process is a video signal that comprises the original lip-objects lo and a rest signal V'. In an embodiment of the post-synchronization system, the video source 1 and the lip-tracker 2 are combined in an MPEG-4 camera. The lip-objects are in that case defined according to the MPEG-4 standard. In an efficient embodiment of the invention the lip-objects are defined by lip-parameters based on a lip-model. The original lip-objects lo are modified in a lip-object modifier 3. Based on the properties of the original lip-objects lo, new lip-objects lo* are generated that correspond to the translated audio signal A*. The lip-object modifier 3 comprises inputs for obtaining other signals, for example information for the new lip-objects lo*. The amount of modifications can vary depending on the information that the lip-object modifier 3 receives. In an extreme case, only the location of the original lip-objects lo is maintained. The translated audio signal A* is input to the lip-object modifier 3 and is used to synchronize the new lip-objects lo* to the translated audio signal A*. The translated audio signal A* can also be used to construct the new lip-objects lo*. The new lip-objects lo* are fed to a lip-object adder 4. In the lip-object adder 4 the new lip-objects lo* are added to the rest signal V'. The new video signal V* that comprises the new lip-objects lo* instead of the original lip-objects lo is thereafter displayed on a display 5. Herewith is achieved that a program is displayed wherein the lip-movement better corresponds to the translated audio signal A*. In an ideal situation the new lip-objects lo* are so well fit into the video signal V* that a viewer will not notice that post-synchronization has been performed.

In another embodiment of the system of FIG. 1, the video signal V' still comprises the original lip-objects lo. In that case, the adder 4 is arranged such to replace the original lip-objects lo with the new lip-objects lo*.

FIG. 1 is an overall representation of a system according to the invention. The post-synchronization system is not necessarily present at one location, but can comprise transmission channels, communication networks, etc. The elements as shown can be distributed over different locations. In a practical embodiment MPEG-4 encoding and decoding will be used, as well as other coding algorithms like channel coding, etc.

Figure 2:
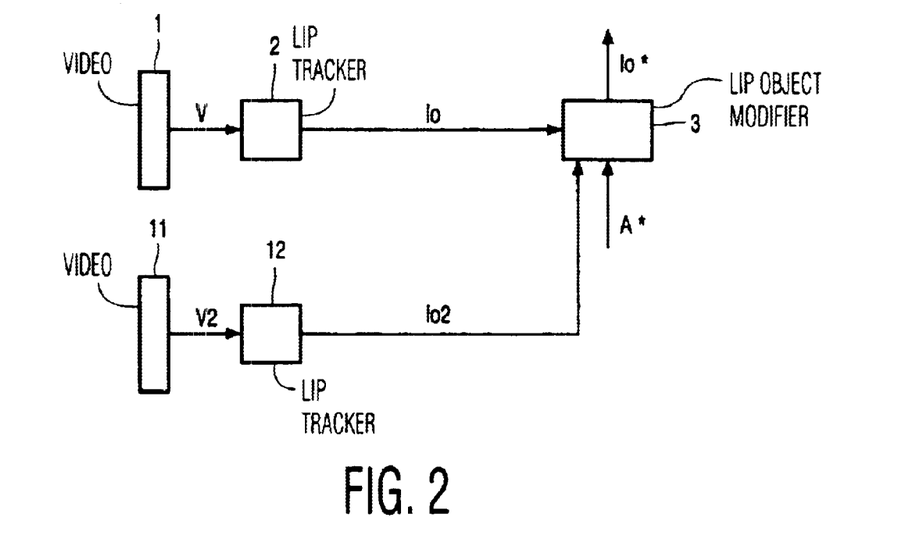
FIG. 2 shows an embodiment for obtaining new lip-objects by tracking a further video signal.

FIG. 2 shows an embodiment for obtaining new lip-objects lo* by tracking a further video signal V2. In the embodiment as shown, a second video source 11 is coupled to a second lip-tracker 12, which is coupled to the lip-object modifier 3. The second video source 11 and the second lip-tracker 12 are similar to the video source 1 and the lip-tracker 2. The second video source 11 produces a second video signal V2. Important is that this video signal V2 comprises in some way lip-movements that correspond to the translated audio signal A*. Tracking the second video signal V2 in the lip-tracker 12 gives second lip-objects lo2 that can be used to construct the new lip-objects lo* for replacing the original lip-objects lo. As well as the original lip-objects lo as the second lip-objects lo2 are fed to the lip-object modifier 3. In the modifier 3 the second lip-objects lo2 are modified to fit in the location of the original lip-objects lo. To achieve this, it may be necessary to change the reference frame coordinates and to apply a transform to the second lip-objects lo2. Preferably, the video source 11 comprises a camera that records the lip-movement of an original actor. In that case, minimal modifications are necessary to get a good result. It is also possible to record someone's others lips, for example those of a translator. In that case more modifications may be necessary, relating to the shape and colors of the lips. The translated audio signal A* is used to synchronize the new lip-objects lo*. If the lip-objects lo2 are already sufficiently synchronized this step may be omitted. The further video signal V2 can also be a synthetic, computer-generated signal.

Figure 3:
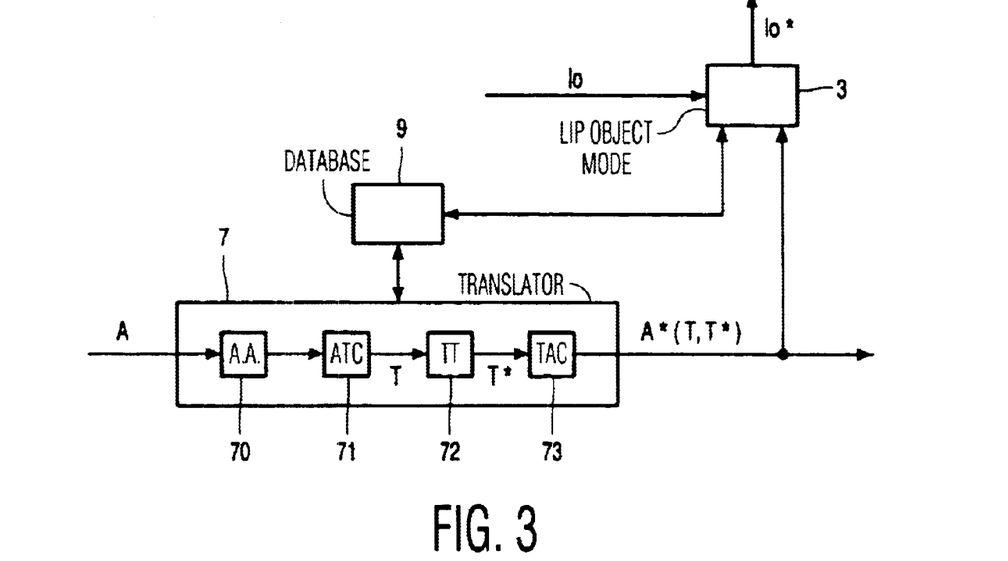
FIG. 3 shows an embodiment of a translator in combination with a lip-object modifier according to the invention.

FIG. 3 shows an embodiment of the translator 7 in combination with the lip-object modifier 3 according to the invention. The translator 7 comprises an audio analyzer 70, an audio-to-text converter 71, a text translator 72 and a text-to-audio converter 73. The translator 7 and the lip-object modifier 3 are both coupled to a database 9. The database 9 may also be distributed over the translator 7 and the lip-object modifier 3. The incoming audio signal A is analyzed in the audio analyzer 70. Components of the audio signal A may be divided into recognizable phonemes as known from the art. Speech recognition at the level of individual phonemes is used in one embodiment of the invention and in another embodiment of the invention, speech recognition at the level of phone groups is used. The phonemes are part of a computer readable phonetic alphabet and are transcribed in text in the audio-to-text converter 71. The output of this unit is a text signal T. The text signal T is translated into a translated text signal T* in the text translator 72. The text translator 72 comprises to this end, some dictionaries and grammatical tools, which can also be available from database 9. The text-to-audio converter 73 converts the translated text signal T* into a translated audio signal A*. The translated audio signal A* is in this embodiment a synthetic signal. The text-to-audio converter 73 can comprise a TTS coder as discussed above. There are several possibilities in this embodiment for the construction of the new lip-objects lo*. A first possibility is to derive the new-lip-objects lo* from the translated text signal T*. A certain combination of letters in a certain language may define phonemes to form an audio signal and at the same time define visemes to construct lip-objects lo*. The phonemes and visemes and their mutual relationships are for example defined in the database 9. The visemes can also be obtained by analyzing the translated audio signal A* and using a phoneme-to-viseme relationship. The implementation is easy if the translated audio signal A* has already been divided in phonemes. Using a phoneme-to-viseme relationship is, for example, useful if the conversion to text is omitted and the translated audio signal A* is obtained in a different manner, for example by recording the voice of a translator with a microphone. The text signal T and the translated text signal T* could further be used as subtitling information and could therefore be included in the information stream that is transmitted. In another embodiment, already available subtitles are used to generate the translated audio signal A* and the new lip-objects lo*.

Figure 4:
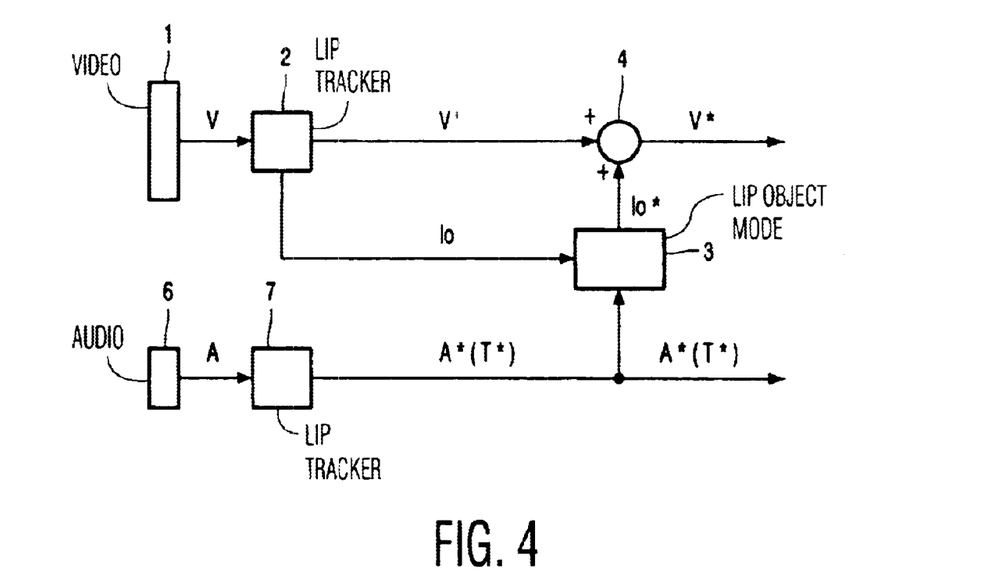
FIG. 4 shows a first transmitter according to the invention.

A first transmitter according to the invention is shown in FIG. 4. This transmitter comprises to a large extend the same elements as the system as shown in FIG. 1 but lacks a display and a speaker. The transmitted information stream comprises the translated audio signal A* and the video signal V* that comprises the new lip-objects lo*. The audio signal A* and video signal V* are channel coded in a usual way. The transmitted information stream can be processed by an ordinary receiver. An ordinary receiver is a receiver that does not comprise means for translating audio signals and modifying lip-objects. Normally, this will be a standard MPEG-4 receiver. The information stream may also be encoded with another coding technique, so to make transmission to other receivers possible. The lip-tracking can be performed by an arbitrary lip-tracking circuit. It is not necessary to use an MPEG-4 encoder, although such an encoder is preferred. It is possible to use an MPEG-4 coding technique in a studio-environment for replacing the original lip-objects lo with new lip-objects lo* and to transmit the information stream in another format, for example MPEG-1/2, NTSC, PAL etc. In this case, a conventional information stream is obtained which comprises lip-movements that correspond to a translated audio signal A*. As discussed above, a translated text signal T* can be transmitted as subtitling information. The translated text signal T* is produced by the translator 7 or in some other manner.

Figure 5:
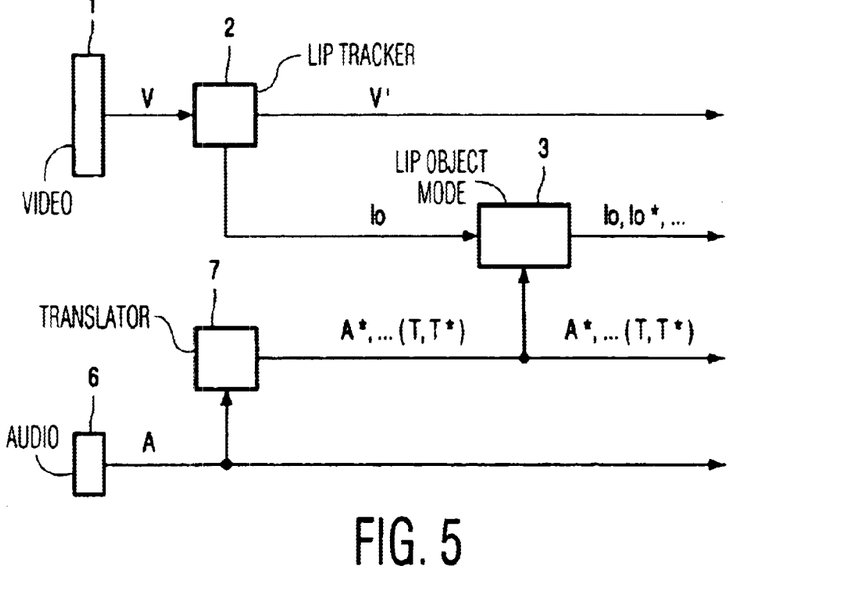
FIG. 5 shows a second transmitter according to the invention.

FIG. 5 shows a second transmitter that transmits a multi-language information stream. The multi-language information stream comprises a plurality of audio signals A, A* as is known from the art. The multi-language information stream further comprises a plurality of lip-objects lo, lo* that are linked to at least one of the audio signals A, A*. Several audio signals are thus available each with their own stream of corresponding lip-objects. Optionally, the information stream comprises text signal T, T* as discussed above.

In an embodiment, the transmitter transmits the video rest signal V' together with the original lip-objects lo and the original audio signal A with in addition one or more translated audio signals A* and streams of corresponding new lip-objects lo*. The streams of lip-objects lo, lo* are linked to a corresponding audio signal A, A* by means of some kind of identifier. It is possible for a lip-object to be linked to more that one audio stream. This can for example be useful when a lip-object is used in more than one audio stream. As described before, it is very convenient to use lip-parameters to define the lip-objects. An advantageous embodiment of the transmitter transmits lip-parameters that are each linked to at least one audio signal. Some lip-parameters will be the same for any language. In that case, it is useful to link those parameters to all languages or send them generically. Other parameters need to be linked to maybe one language. When sending lip-parameters it is possible to only send the differences between lip-parameters for different languages. In that way, an efficient, lower bit rate transmission is obtained. The presence of multiple languages in audio as well as video may be indicated in a program specific information stream. A program specific information stream specifies which programs are available, as well as how many and which elementary streams each program comprises.

Figure 6:
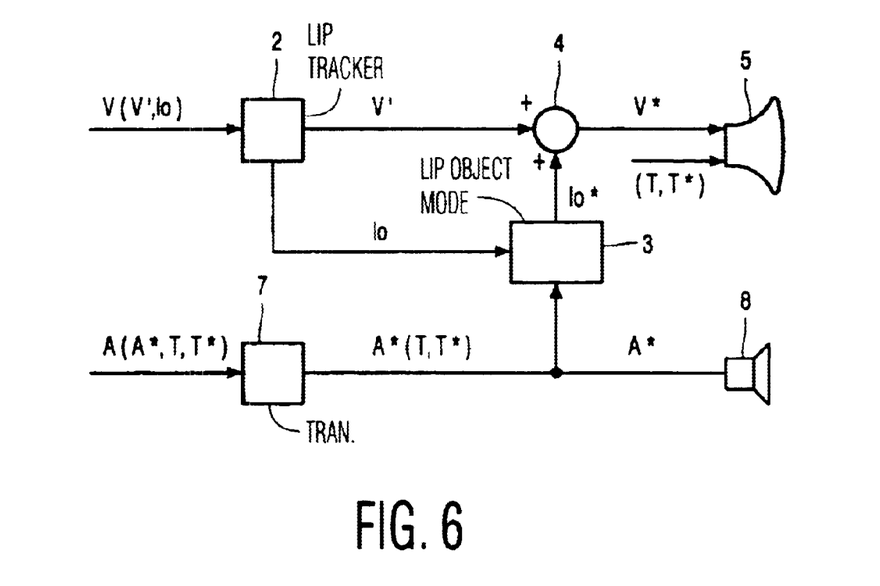
FIG. 6 shows a first receiver according to the invention.

FIG. 6 shows a first receiver according to the invention. This receiver receives an information stream from some transmission channel such as an antenna, a network etc. The video signal V may be received as produced by the video source 1 or after some kind of encoding. Because lip tracking was not performed on this signal, the original lip-objects have not yet been obtained. In that case, a lip-tracker 2 is necessary. It is possible that lip-objects or lip-parameters have already been obtained, for example when the information stream was MPEG-4 encoded. In that case, the lip-tracker 2 can be omitted in the receiver. This means that the video rest signal V' together with the original lip-objects lo are received by the receiver. The audio signal can be a translated audio signal A* or a non-translated audio signal (A). In case the audio signal has not been translated, a translator 7 is necessary to obtain the translated signal A*. Depending on the incoming information stream the translator 7 and the lip-tracker 2 are optional. The translated audio signal A* is output to the speaker 8. The lip-objects lo in the video signal V' are replaced by new lip-objects lo* in a way as already described. The text signals T, T* can optionally be displayed on the display 5.

Figure 7:
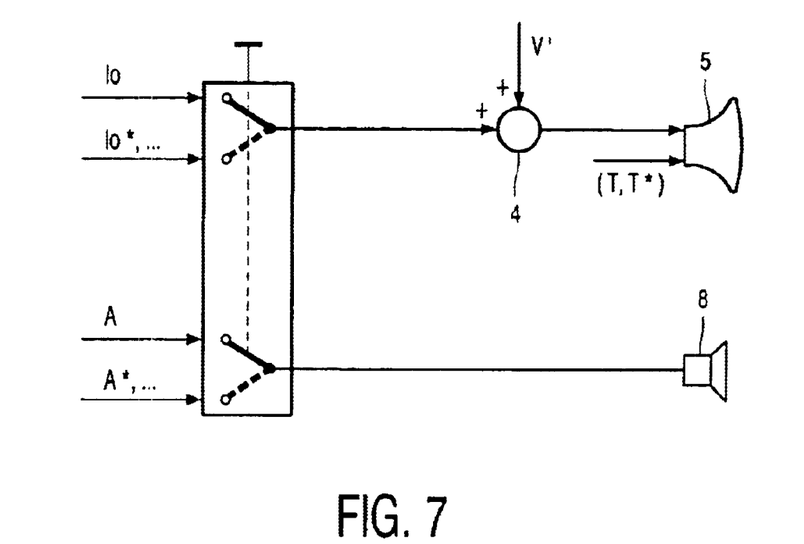
FIG. 7 shows a second receiver according to the invention.

FIG. 7 shows a second embodiment of the receiver according to the invention. This embodiment is especially applicable in combination with a transmitter as shown in FIG. 5. An information stream with a video rest signal V' and a plurality of lip-objects lo, lo* and a plurality of audio signals A, A* is received. The receiver may also receive some text signals T and translated text signals T* that can be used as sub-titles. A selector 10 selects one of the audio signals A, A* to be output to the speaker 8. The selector is preferably user-selected. The selector further selects the corresponding lip-objects lo, lo*. These lip-objects lo, lo* can be parameterized. In that case only the lip-parameters are received. The selected lip-objects lo, lo* are added to the video rest signal V' to constitute a video signal V, V* for displaying on the display 5. As discussed in relation to FIG. 1, the video signal V' can also still comprise the lip-objects lo. If an original language is selected, the original lip-objects lo are not replaced by other lip-objects and the video signal V' is displayed with the original lip-objects lo. If another language is selected, the adder 4 replaces the lip-objects by the selected lip-objects lo*.

The user can select a desired text signal T, T* as additional feature.

Figure 8:
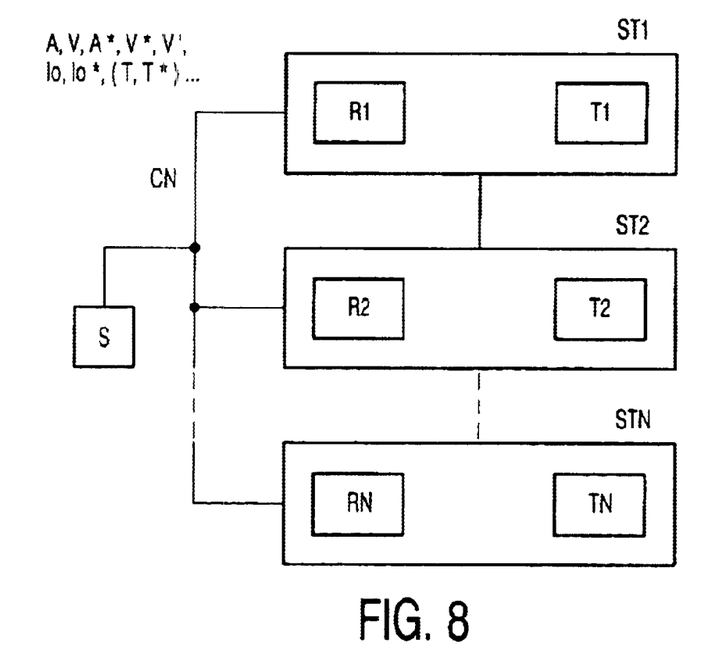
FIG. 8 shows a communication system according to the invention.

FIG. 8 shows a communication system according to the invention. The communication network comprises stations ST1, ST2, . . . , STN and a communication network CN. Examples of a communication network are Internet, Intranet, ISDN, DVB, etc. Station ST1 comprises a receiver R1 and a transmitter T1. Station ST2 comprises a receiver R2 and a transmitter T2 and station STN comprises a receiver RN and a transmitter TN. Stations that only comprise a receiver or a transmitter are also possible. According to the invention the communication system comprises means for performing a translation process, means for tracking a video signal and means for replacing original lip-objects with new lip-objects. These means can be present in the communication system at any location. The transmitters and receivers of the stations can for example be similar to the transmitters and receivers described before in relation to the FIGS. 2–7. Although it is possible to only locally have a receiver according to the invention, normally transmitters according to the invention are also present. In consequence, in most cases the information streams traveling over the communication network CN will comprise translated audio signals A* and corresponding lip-objects lo* in addition to normal audio A and video signals V, V'. In many cases, also text signals T and translated text signals T* will be present in the information streams. In an embodiment where a transmitter as shown in FIG. 2 is present in one of the stations ST1, ST2 . . . STN also signals V* are included in the information streams. The stations ST1, ST2 . . . STN may be substantially identical or different. A practical application of a communication system is video conferencing. Preferably, the translation of audio and the replacement of the lip-objects is performed real-time. This is possible when sufficient computational power is available. A small delay may be accepted. Because in the case of videoconferencing a delay occurs in two directions it should be kept as low as possible.

Finally, any of the possible information streams may be stored on a storage medium. This can be a storage medium S as shown in FIG. 8 that stores information streams from the network and supplies stored information streams to the network or any other storage medium. Examples of other suitable storage media are tapes, DVD discs, CD-ROMs, etc.

An example of another suitable coding standard is H.323.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware.

In summary, the invention provides a method for post-synchronizing an information stream. According to the invention, original lip-objects are obtained from the video signal. These original lip-objects are replaced with new lip-objects, which correspond to the translated audio signal. Lip-objects can be obtained from a video signal by using an object-oriented coding technique, e.g. MPEG-4. The coding standard MPEG-4 offers the facilities to manipulate the lip-objects. Several configurations are presented. The new lip-objects can be obtained by tracking a further video signal or by using a database with visemes or lip-parameters. The invention is suitable for a communication network, e.g. for video-conferencing. A multi-language information stream comprises a plurality of audio signals and a plurality of lip-objects that are each linked to one of the audio signals. This gives the possibility to select at the receiver a desired language. An advantage of the invention is that lip-movement better corresponds to the translated audio.

What is claimed is:

1. A method of post-synchronizing an information stream, which information stream comprises an audio signal (A) and a video signal (V), the method comprising the step of:

performing a translation process (7) to obtain at least one translated audio signal (A*), tracking (2) said video signal (V) to obtain original lip-objects (lo);

replacing (3,4) said original lip-objects (lo) with new lip-objects (lo*), said new lip-objects (lo*) corresponding to said translated audio signal (A*);

wherein said translation process (7) comprises the steps of:

converting (70,71) the original audio into translated text (T*); and deriving (73,9,3) said translated audio signal (A*) and said new lip-objects (lo*) from said translated text (T*).

2. A method according to claim 1, characterized by comprising the step of:

obtaining (11,12,3) said new lip-objects (lo*) by tracking (12) at least one further video signal (V2), said further video signal (V2) comprising lip-movements corresponding to said translated audio signal (A*).

3. A method according to claim 1, characterized by comprising the steps of:
   dividing (70) said translated audio signal (A*) into phonemes;
   retrieving, from a database (9), visemes that correspond to said phonemes; and
   constructing (3) said new lip-objects (lo*) from said visemes.

4. A method according to claim 1, characterized by comprising the steps of:
   deducting (2,3) lip-parameters from said original lip-objects (lo);
   modifying (3) said lip-parameters to obtain new lip-parameters for constructing said new lip-objects (lo*).

5. A method of post-synchronizing an information stream, which information stream comprises an audio signal (A) and a video signal (V), the method comprising the step of:
   performing a translation process (7) to obtain at least one translated audio signal (A*);
   dividing (70) said translated audio signal (A*) into phonemes;
   retrieving, from a database (9), visemes that correspond to said phonemes; and
   constructing (3) new lip-objects (lo*) from said visemes;
   tracking (2) said video signal (V) to obtain original lip-objects (lo); and
   replacing (3,4) said original lip-objects (lo) with said new lip-objects (lo*), said new lip-objects (lo*) corresponding to said translated audio signal (A*);
   wherein the translation process (7) comprises the steps of:
   converting (71) said phonemes into text (T);
   translating (72) said text (T) into translated text (T*); and
   deriving (73) said translated audio signal (A*) from said translated text (T*).

* * * * *